July 2, 1935.  A. W. MORTON  2,006,365
PACKING RING
Filed Jan. 24, 1933
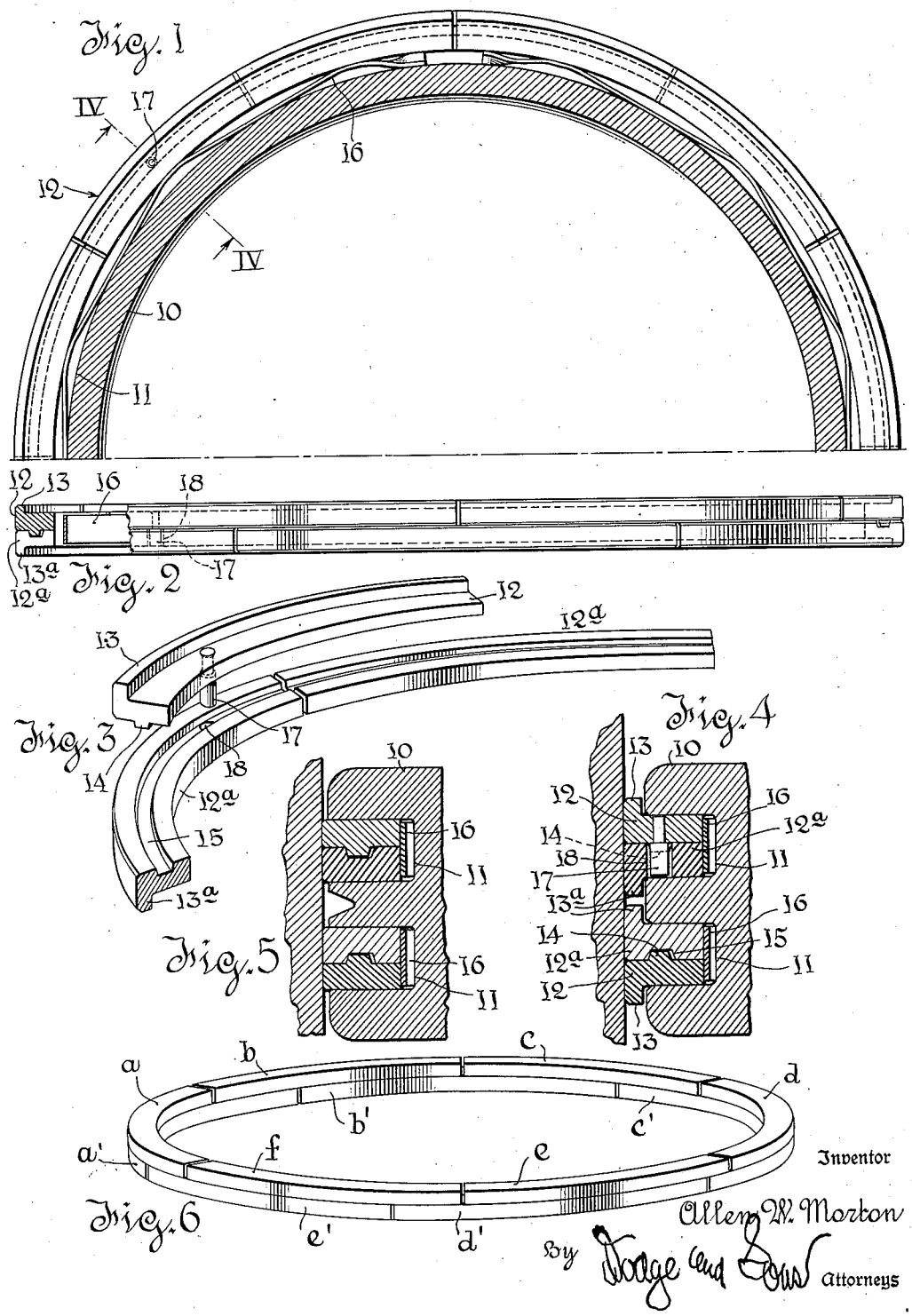
Inventor
Allen W. Morton
By Dodge and Sons Attorneys Patented July 2, 1935

2,006,365

UNITED STATES PATENT OFFICE 2,006,365

PACKING RING

Allen W. Morton, Baltimore, Md., assignor, by mesne assignments, to The Bartlett Hayward Company, Baltimore, Md., a corporation of Maryland Application January 24, 1933, Serial No. 653,303

5 Claims. (Cl. 309—27)

This invention pertains to an improvement in packing rings and while the structure is of general application it is especially designed for use in connection with locomotives wherein the rings are subjected to considerable wear and have to be quite frequently renewed.

The main object of the present invention is to provide a ring structure, which, though simple, is nevertheless effective in operation, readily adapting itself to out-of-round cylinders and also readily seating itself upon the side walls of a worn piston groove.

Another object of the invention is to produce a ring composed of two series of arcuate or segmental sections, which sections are of such form and so related that when forced or urged outwardly as the piston passes over unequal diameters of the cylinder, the various sections of the packing are also moved laterally away from each other and contact the side walls of the piston groove, sealing the groove against the passage of steam or other motive fluid and likewise preventing rocking or tipping of the ring and consequently diminishing the wear of the ring upon the walls of the groove.

A further object is to provide a structure which will prevent blow-by to a marked degree. The inner expander ring which is flat in cross section and polygonal in outline, divides the space behind the segmental piston ring into separate compartments so that any leakage through a joint of one series of segments will not travel around behind the ring to any appreciable extent and pass out through a joint in the opposite series.

A still further object is to produce uniform pressure of the segments against the cylinder regardless of minor inequalities in the ring groove on account of alternate contacts of the expander ring with the bottom of the ring groove and the individual segments of the piston ring. The spring also tends to centralize the piston and cushion the same against any tendency to slap.

The invention is illustrated in the annexed drawing wherein:

Fig. 1 is a sectional elevation showing a portion of a piston with the ring of the present invention seated in the groove of the piston;

Fig. 2, a sectional elevation of the ring as viewed from the edge thereof;

Fig. 3, a perspective view of a number of segmental sections which go to form the ring and illustrating means for preventing undue relative rotative movement of the segments of one of the series with reference to those of the other series while still permitting facewise movement of such series with reference to each other;

Fig. 4, a transverse sectional view taken on the line IV—IV of Fig. 1, the parts being upon an enlarged scale;

Fig. 5, a similar view showing a slightly modified form of ring insofar as the cylinder contacting face of the ring is concerned; and Fig. 6, a perspective view illustrating the two series of arcuate sections forming a ring, the sections of one series being longer than those of the other, whereby aligning of the joints between the ends of the sections of the two series is precluded to a greater or less extent.

Locomotive piston rings are subjected to considerable wear and have to be replaced frequently. The ring forming the basis of this invention may be readily placed within a piston groove and will seat itself, not only against the side walls of the groove but likewise against the face of the cylinder,—be the cylinder true or out-of-round.

The structure is such that the sections or segments of the two series which stand in facewise relation to each other will readily accommodate themselves to the inequalities of a cylinder and not only be forced outwardly toward the cylinder wall but, as the piston moves over unequal diameters of the cylinder, the sections will also be forced laterally into contact with the side walls of the ring groove. In other words the parts are not secured to each other and are free to move relatively to each other except, and only, as rotative movement of the segments of one series is restricted or limited with reference to the segments of the other series. In Fig. 6, however, even this means is not present.

Referring first to the structure shown in Figs. 1 to 4, 10 denotes the piston having a ring-receiving groove, or grooves, 11. The ring in this instance is composed of two annuli, each annulus being produced from a series of segmental or arcuate sections placed end to end, the sections of one annulus being denoted generally by 12 and those in the other by 12ᵃ. Each of these sections may be said to comprise a main body portion provided with a laterally extending flange, said flanges extending in opposite directions and being denoted respectively by 13 and 13ᵃ in the two series. The sections 12 are also formed with ribs or flanges 14 which extend toward the complemental members 12ᵃ in the other series and are designed to enter a channel or groove 15 formed in the adjacent face of such members.

As will be best seen upon reference to Figs. 2, 3, 4 and 5, the ribs 14 are tapered and the side walls of the groove or channel 15 are given a reverse taper. It will likewise be seen that the rib is of such dimension that it does not fully fill the groove.

When seated within an unworn piston groove the segments 12 and 12ª of the two series will stand in close facewise relation with but slight clearance between such segments and likewise between them and the wall of the ring groove.

Seated within the piston groove, and bearing against the various segments throughout both series which compose the ring is an expander spring 16. Said member will preferably be formed so as to present a series of long sections which bear against the bottom of the ring-receiving groove and shorter sections which bear against the inner face of the ring, the spring being of such width as to bear upon both series of sections and yet not wide enough to contact and bind against the side walls of the groove. Such a spring insures a substantially even outward pressure upon the various sections of which the ring is composed.

As will be seen upon reference to Fig. 1, the ends of the springs are preferably twisted in opposite directions;—this with a view of having one end catch in a joint between two segments while the other end will doubtless catch in a rough place in the piston groove. By twisting each end of the spring, and this in opposite directions, any tendency of the spring to cant the overlying segmental sections of the ring is minimized. This arrangement also prevents or reduces to a marked degree relative rotary motion or movement between the spring and the piston and the spring and the packing or ring.

To prevent aligning of the joints between the segments of the two annuli there may be provided a pin, as 17, secured in one of the segments of one of the annuli and extending freely through an opening 18 formed in the opposite segment in the other annulus. The pin and opening will of course be so positioned relative to their respective segments as to throw the joints of the segments of the annuli out of alignment. The pin is freely movable in the opening 18, hence the parts are not fastened together but have a floating relation and consequently are free to move both laterally toward and from each other and consequently toward and from the side walls of the ring-receiving groove. The two annuli also may have slight radial and circumferential movements relatively to each other due to the floating connection insured by the pin passing into the enlarged opening. Thus the individual segments may seat independently of one another against the cylinder wall and/or against the side walls of the piston groove.

The spring 16 will tend to move the segments outwardly and, with the aid of steam pressure which passes beneath the packing, the various segments of the packing will be held tightly against the cylinder and when the piston passes over unequal portions of the cylinder, the tapered formation of the ribs—or tongue 14 and groove 15—will cause the segments of the ring to not only be moved outwardly but laterally as well. As will be seen upon reference to the drawing, and more particularly Figs. 1, 4 and 5, spring 16 is of a width such that its edges do not contact the side walls of the ring-receiving groove, but underlie the major portion of the two series of segments. This permits a slight twist of the spring when the segments and/or cylinder become worn, so that the spring will function at all times to move the segments outwardly with relation to each other and to the cylinder with which they cooperate, particularly when the cylinder is out of round or "bellied". This brings the cylinder-contacting face of the ring into proper sealing relation with the wall of the cylinder and, through the wedging action, forces the segments laterally into close contact with the side walls of the piston groove. This action is specially advantageous where the ring is positioned in a ring-receiving groove which has become worn and the side walls of which stand in a diverging relation toward the outer face or side of the piston. It has been found in actual practice that by reason of the wedging relation of the parts and the forcing of the same outwardly by the spring 16 that a full cylinder-contacting bearing surface is effected after the ring has seated and instead of wearing round, as is usual with piston rings, the outer faces of the segments will trace a straight line from side to side of the ring.

Locomotive cylinders present somewhat peculiar conditions when it comes to installing piston rings which will properly function therewith. For instance, in a locomotive cylinder where the steam is admitted at one end through a port at high pressure and this steam moves the piston away from that end of the cylinder, the pressure in the cylinder, as will be appreciated, gradually diminishes, and at the opposite end of the stroke of the piston an exhaust port is opened and the pressure drops to zero. However, when steam is admitted to both ends of a locomotive cylinder and, consequently, on opposite sides of the piston, pressure rapidly builds up and moves the piston back to the end of the cylinder from which it originally started, and as the piston travels, the pressure in that part of the cylinder gradually diminishes until the piston is at the extreme end of the stroke and the other exhaust port is opened and the pressure drops to zero.

The pressure diagram in the cylinder of a double acting locomotive engine would, therefore, trace an indicator diagram something on the order of an hour glass or a spool. In short, the pressure diagram would show excessive pressure at either end of the cylinder, and a much lower pressure in the center of the cylinder.

It has been found, in practice, that locomotive cylinders wear in exact accordance with the pressure diagram, or, in other words, the indicator card. Consequently, the packing rings have to move in and out of the piston grooves as the piston travels through the length of its stroke, in order to maintain proper contact with the cylinder wall. The amount of this in and out travel of the packing ring is frequently as great as one-quarter of an inch from the smallest diameter of the cylinder which is in the longitudinal center to the maximum diameter of the cylinder at either end.

In addition to this characteristic wear of a locomotive cylinder, there is another characteristic that is almost as important when it comes to the function of the piston rings. This is due to the fact that the piston and cylinders are horizontally disposed and, consequently, due to the weight of the piston and packing rings resting on the bottom of the cylinder, there is a tendency to wear the cylinder out of round and oversize on the vertical dimension. Sometimes, however, due to the misalignment of the piston crosshead, a severe thrust causes the cylinder to wear "bellied" or out of round in a different direction. The general characteristic, however, is for the cylinder to wear large on either end and also larger on the vertical dimension than on the horizontal dimension.

It is, therefore, quite obvious that the average locomotive cylinder will be of unequal diameter throughout, and hence the packing necessarily has to move in and out of the piston groove to follow the contours or irregularities of such a cylinder, if the packing is designed to make a cylinder contact at all times. The packing of the present case functions in this manner.

It is to be kept in mind that the packing of the present case has an expander placed between the piston and the packing so as to hold the packing in contact with the cylinder at all times; this regardless of the out of round condition or tapered condition of the cylinder. A packing of the type herein disclosed follows the contour of the cylinder and the inequalities or out of roundness of the cylinder, and, consequently, is continually moving in and out of the piston groove as the piston moves back and forth throughout its stroke.

As the piston moves from the smaller portion of the cylinder toward the larger part of the cylinder, it follows that the leading section of the packing moves into the larger part of the cylinder a little in advance of the following or trailing section of the packing and, therefore, the leading section of the packing moves outwardly with reference to the trailing section of the packing as the piston moves from the smaller to the larger part of the cylinder. This outward movement of one section of the packing with reference to the opposite section of the packing, which would be helped by means of a slight twist in the spring underneath the packing, and also due to steam pressure underneath the packing or underneath the flange of the packing holding the packing out against the cylinder, will also cause the packing to move sideways in the piston groove, were the groove flared or enlarged to such an extent as to allow this side movement. Grooves, of course, become flared owing to wear. Then, on account of the tapered tongue and grooved portions of the opposing sections of packing, there would be a tendency to wedge the opposing sections of the packing sidewise as they move in and out through different diameters of the cylinder with reference to one another and with reference to the piston groove.

This irregularity of movement of the various sections or segments of the packing produces an operating condition which causes the packing to bear laterally against the lands of the piston groove, and at the same time, against the cylinder itself. Moreover, while the tapered tongue and groove construction keeps the packing tight against the sides of the piston groove, it also has the function of preventing the ring segments from catching in the counterbore should the piston over-travel.

The provision of the oppositely disposed lateral flanges 13 and 13ª produces a somewhat extended bearing surface. Their presence, however, is not essential and in Fig. 5 ring structures wherein they are omitted are shown. The structure is otherwise the same as that above described.

It is of course conceivable that the segments of the two annuli may vary in number so as to inhibit alignment of segment joints. Thus, as seen in Fig. 6, the upper annulus is produced from six segments designated a, b, c, d, e and f and the lower one of five segments designated a', b', c', d' and e'. By producing the annuli with a variation of one in the number of segments employed it will be readily perceived that at no time can more than one joint between segment ends in one annulus coincide with a similar joint in the other.

Initially positioned in a ring groove with the joints in nonregistering relation, the expander spring acting as above specified will tend to prevent relative rotative movement of the annuli and consequently to maintain the parts as positioned.

A cross section of the ring as shown in Fig. 6 appears as in Fig. 5, with the inner expander spring positioned behind the ring in the ring-receiving groove in the piston.

What is claimed is:

1. In combination with a piston having a ring-receiving groove; a piston ring mounted in said groove, said ring embodying two series of arcuate cylinder-contacting sections, the sections of each series arranged end to end and said series lying in facewise relation to each other within said groove and free to move laterally throughout each series away from each other toward the adjacent side wall of the ring groove and also movable radially therein; spring means located within the groove to the rear of and bearing upon the sections of each series and urging all of such sections outwardly of the groove, said spring being flat in cross section; and means formed upon the opposed faces of the arcuate sections of each series to cause the same to move axially with respect to the other under the influence of said spring means and likewise limiting the relative radial movement of one series with reference to the other.

2. In combination with a piston having a ring-receiving groove; a piston ring mounted in said groove, said ring embodying two series of arcuate cylinder-contacting sections, the sections of each series arranged end to end and said series lying in facewise relation to each other within said groove and free to move throughout each series away from each other toward the adjacent side wall of the ring groove and also being radially movable therein; an expander spring acting directly on each section and urging all of said sections outwardly of the groove; and oppositely disposed coacting means on the adjacent faces of the series of said segments which under the influence of said expander effects lateral movement of the segments of each series toward the adjacent side wall of the groove as the sections are moved outwardly of the groove, said means also permitting a limited radial movement of said segments of each of the series independent of any radial movement of the segments of the other series.

3. A piston ring comprising at least two cylinder-contacting annuli lying in facewise relation and free to move relatively to one another throughout each annulus toward and from each other, and likewise free to move radially of a piston groove in which they may be mounted, independently of each other, each annulus being formed from a plurality of arcuate members arranged in end to end relation, the opposing side faces of each of the arcuate members of the annuli being provided with complemental interengaging, coacting wedging faces, said faces having a clearance therebetween permitting limited radial movement of the segments of one of the annuli with reference to those of the other.

4. The combination with a piston having a groove therein, of a piston ring seated in said groove and comprising two sets of arcuate cylinder-contacting sections, the sections of each set standing in end to end relation; means for preventing the joints between the sections of one set from lining up with the joints between sections of the other set but permitting relative and free axial movement of all of the sections; an expander spring polygonal in outline bearing against the innermost face of each and all of the sections of each set of sections and likewise bearing against the bottom of the ring groove to urge all of the said sections radially outwardly of the groove and forming a plurality of spaced chambers behind the ring sections; and means formed integral with the sections and upon the opposed faces of each series for causing axial movement of the sections within the groove as the sections are urged in an outward radial direction by the spring.

5. In combination with a piston having at least one ring groove, a piston ring mounted therein, said ring comprising at least two cylinder-contacting annuli lying in facewise relation and free to move relatively to one another throughout each annulus toward and from each other and radially of the groove, each annulus being formed of a plurality of arcuate members standing in end to end relation, one face of the arcuate members of one annulus being provided with a wedge-shaped rib extending outwardly therefrom and into a channel or groove of complemental contour formed in the opposing face of the arcuate members of the other annulus, there being clearance between said groove and the rib to permit relative radial movement; and a spring underlying all of said arcuate members and acting to move the ring as a whole outwardly and the annuli with reference to each other, and consequently toward the side walls of the ring groove by reason of the spreading action of the rib and groove construction aforesaid as the piston moves through a restricted or out-of-round portion of the cylinder.

ALLEN W. MORTON.